(No Model.)
A. E. SCHAAF.
BALL BEARING FOR BICYCLES.
No. 287,476. Patented Oct. 30, 1883.
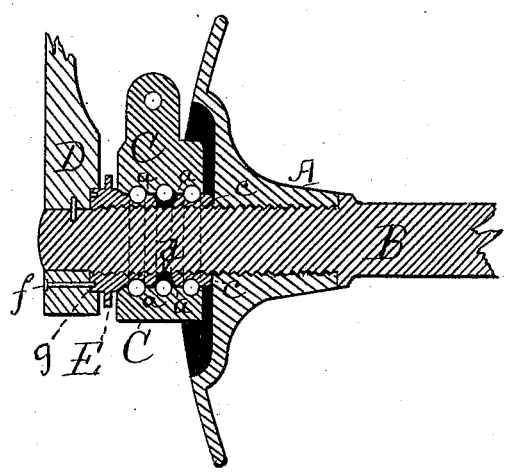
Witnesses:
T. A. Parsons
J. R. Drake.
Albert E. Schaaf
Inventor, by
J. R. Drake,
Atty.

UNITED STATES PATENT OFFICE.

ALBERT E. SCHAAF, OF BUFFALO, NEW YORK.

BALL-BEARING FOR BICYCLES.

SPECIFICATION forming part of Letters Patent No. 287,476, dated October 30, 1883.

Application filed September 10, 1883. (No model.)

*To all whom it may concern:*

Be it known that I, ALBERT E. SCHAAF, a citizen of the United States, residing at Buffalo, in the county of Erie and State of New York, have invented certain new and useful Improvements in Ball-Bearings for Bicycles, of which the following is a specification, reference being had therein to the accompanying drawing.

This is an improvement on bicycles having two ball-bearings; and the invention consists in adding a third row of balls to equalize the bearings, make the movement steadier, and do away greatly with side straining.

It also consists in the arrangement and adjustment of the balls, all as fully hereinafter explained.

In the drawing, the figure is a cross-section through the hub, axle, crank-shaft, central collar, &c.

A represents the hub on axle B, screwed thereon, as usual; C, the central collar, to which the fork is attached; D, the crank-shaft.

The central collar, C, is made in one piece, having two central circular ridges, $a$ $a$, and, with the outside edges, making three half-annular grooves for three rows of balls to run in. The other halves of these grooves, which make the ball-bearings, are as follows: Screwed on the axle B, next the hub A, is a short steel collar, $c$, having one groove therein to correspond with the half-groove in the inner end of the central collar, C. The other end of this short collar $c$ is beveled off into a quarter-groove, leaving a slight space, $d$, between it and a correspondingly quarter-grooved end of the screw-collar E, which is screwed on the axle between the crank-shaft D and central collar, C, this quarter-grooved inner end projecting into the central collar, leaving this space $d$ for oil, and also to allow adjustment of the bearings, which is done by turning up this collar E. In the projecting part is also a half-groove corresponding to the half in the outer end of the central collar, C, this giving the bearings for the third and last row of balls.

To keep the balls and screw-collar E in place when set, I provide a screw, $f$, which goes longitudinally through the bottom of the crank-shaft D and into one of a series of holes, $g$, in the face of the screw-collar, said face recessing in the side of the crank-shaft, as shown in the drawing. This adjustment is simple and effective, the space $d$ allowing for considerable inward movement of the screw-collar to adjust it, as well as keeping the bearings evenly lubricated.

This invention is not to merely multiply the balls in the bearings of bicycles, as four rows would be too many, making too much friction and adding to the weight, while one or two rows of balls do not give sufficient steadiness, three rows giving just the right number for steadiness, and preventing side straining. It has also greater wearing qualities, therefore will last longer, runs smoother and more evenly, and is consequently better adapted to rough and hilly roads.

I claim—

In a bicycle, in combination with the wheel-hub and axle, the central collar, C, constructed with the three half-annular grooves therein, the short collar $c$, having one half-annular groove, and its end formed into a quarter-groove, the screw-adjusting collar E, having a beveled end, forming a quarter-groove and one half-annular groove, all for the reception of the three rows of balls, and with the central oil and grooved space, $d$, between collars $c$ and E, and the tightening screw or screws $f$, passing through the lower part of the crank-shaft D into the adjusting-collar E, the latter recessing into the side of the crank-shaft, all substantially as specified.

In testimony whereof I affix my signature in presence of two witnesses.

ALBERT E. SCHAAF.

Witnesses:
J. R. DRAKE,
GEO. A BURNETT.